United States Patent
Nilsen et al.

(10) Patent No.: US 7,166,230 B2
(45) Date of Patent: Jan. 23, 2007

(54) APPARATUS AND METHOD FOR SEPARATING AND FILTERING PARTICLES AND ORGANISMS FROM FLOWING LIQUIDS

(76) Inventors: Halvor Nilsen, Randabergvn 101, N-4027 Stavanger (NO); Birgir Nilsen, 6 Howes Ave., Stamford, CT (US) 06906

(*) Notice: Subject to any disclaimer, the term of this patent is extended or adjusted under 35 U.S.C. 154(b) by 28 days.

(21) Appl. No.: 10/501,149

(22) PCT Filed: Dec. 31, 2002

(86) PCT No.: PCT/US02/41909
§ 371 (c)(1), (2), (4) Date: Oct. 20, 2004

(87) PCT Pub. No.: WO03/059821
PCT Pub. Date: Jul. 24, 2003

(65) Prior Publication Data
US 2005/0040091 A1   Feb. 24, 2005

(51) Int. Cl.
*B01D 35/06* (2006.01)
*C02F 1/00* (2006.01)

(52) U.S. Cl. .............. 210/739; 210/748; 210/788; 210/304; 210/108

(58) Field of Classification Search ............... 210/304, 210/748, 108, 788, 739
See application file for complete search history.

(56) References Cited

U.S. PATENT DOCUMENTS 4,271,019 A * 6/1981 Galletti ............ 210/108

* cited by examiner

*Primary Examiner*—Chester T. Barry
(74) *Attorney, Agent, or Firm*—Patrick J. Walsh (57) ABSTRACT

A device (1) for separating and filtering particles and organisms from a high volume flowing liquid operating under low pressure. The device (1) includes a conical or cylindrical shape inlet chamber (3) were liquids enter tangentially creating a circular flow without creating a vortex, the liquids accelerate into a separation and filter chamber (14) where the liquids spin around a longitudinally disposed filter element (11) in the center of the chamber (14), with the centrifugal forces separating out larger and heavier particles towards the perimeter of the separation and filter chamber (14), and where smaller particles having a specific gravity closer to that of the liquid are filtered when the liquid penetrates through the filter element wall into the center of the filter element and flows out one of the longitudinal outlets of the unit. Ultraviolet light irreparably damages bacteria, microorganisms and pathogens contained in processed ballast water and may be incorporated as part of the system.

16 Claims, 5 Drawing Sheets

APPARATUS AND METHOD FOR SEPARATING AND FILTERING PARTICLES AND ORGANISMS FROM FLOWING LIQUIDS

FIELD OF THE INVENTION

This application is directed to an apparatus and method for separating and filtering particles and organisms from a high volume flowing liquid operating under low pressure, with an automatic back flushing self-cleaning system, with ultraviolet treatment of water and use of the device in a ballast water treatment system for ships.

BACKGROUND OF THE INVENTION

The invention relates to a unit for separating and filtering particles and organisms from a high flowing liquid operating under low pressure with an automatic back flushing self-cleaning system aboard ships ballast water systems.

DESCRIPTION OF PRIOR ART

A separator is normally used to remove suspended solids particles from liquids having a different size and specific gravity. This is achieved by the liquid entering tangentially, setting up a circular flow creating a vortex then entering the separation chamber were the centrifugal action directs particles heavier than the liquid to the perimeter of the separation chamber. Sludge is collected in the lower chamber and bled through a sludge discharge pipe. The liquids free of particles are drawn out from the center of the separator and can exit in the bottom or the top of the unit. Simple controls regulate the balance of flow between clean liquid and sludge and maintain the system pressure required for sludge discharge.

A filter is used for the same purpose thus creating a higher-pressure loss making it difficult to use a filter device with high volume flowing liquids under low pressure, this is especially relevant for installations aboard ships where space and weight constraints prevail.

SUMMARY OF THE INVENTION

It is an objective of the invention to provide a device that can separate and filter particles and organisms from a high volume flow of liquid under low operating pressure thereby reducing the size, weight of the device and thereby simplifying operational issues relating to the challenge of treating ballast water aboard ships.

Traditional filters require large space to be able to treat the necessary flow volume requirements, and, in addition, increase ballasting time required because of excessive back flushing cycles. Hydro-cyclones operate well without maintenance and work well removing particles down to a certain size and specific gravity, but not organisms because of their specific gravity, which is close to that of water.

This invention provides for, both the ease of use of a hydro-cyclone and the efficiency of a filter, in one device.

To this end the invention provides a device for separating and filtering particles and organisms from a high volume liquid flow operating under low pressure, with an automatic back flushing self-cleaning system, comprising:

- a cone-shaped or cylindrical inlet chamber with an upper inlet/outlet pipe extending longitudinally through the center of the chamber;
- a separation and filter chamber with a longitudinal filter element connected to the said upper back flushing inlet pipe;
- a discharge chamber with a longitudinal lower outlet pipe connected to the said filter element in the center, separated from the separation and filter chamber by a flow restrictor;
- a tangential liquid inlet opening into said inlet chamber creating an circular flow increasing down towards the said separation and filter chamber where the liquid spins around the filter element, separating out larger particles towards the perimeter and filtering smaller particles and organisms as they follow the main flow towards the main outlet pipe in the bottom of the unit; and,
- a backpressure valve installed on the main outlet pipe ensures sufficient backpressure to discharge the sludge discharge from the sludge chamber.

In a preferred embodiment, the apparatus and method includes a UV chamber for treating processed liquid in order to inactivate aquatic nuisance species including bacteria, microorganisms and pathogens.

The back flushing cycle is initiated by a pressure differential between the main inlet and the outlet. When the pressure differential reaches a preset level (typically, 30 mbar) across the filter/separator chamber back flushing is initiated and controlled by a Programmable Logistic Computer (PLC).

The filter/separating device of this invention is particularly suitable for the use of removing particles and organisms aboard ship ballast water systems, to reduce sediment loads in the ballast tanks and to prevent the spreading of aquatic nuisance species. Ships use high flow low-pressure pumps, and the pump room is normally below sea level creating a backpressure in the sludge discharge system.

Other advantages and preferred features of the invention will become apparent from the following description of the preferred embodiments, given by way of no limiting example, with reference to the accompanying drawing.

BRIEF DESCRIPTION OF THE DRAWING

A preferred embodiment of the invention has been chosen for detailed description to enable those having ordinary skill in the art to which the invention appertains to readily understand how to practice the invention and is shown in the accompanying drawing in which.

DETAILED DESCRIPTION OF THE PREFERRED EMBODIMENT

Figure 1A:
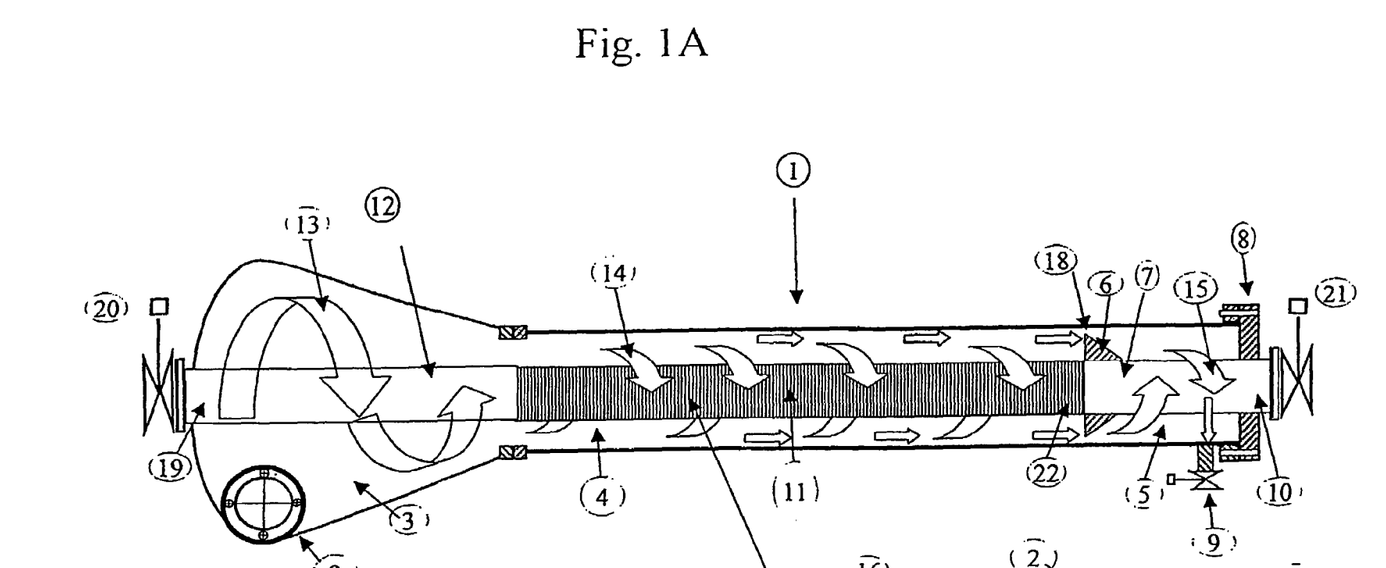
FIG. 1A is a schematic longitudinal section view of the filter/separator device in accordance with the invention.

Referring to FIG. 1A of the drawing, the principal components of the liquid separator and filter device (1) are inlet chamber (3), separation and filter chamber (4), sludge chamber (5), and longitudinally disposed upper outlet pipe (19), cylindrical filter element (11) and lower outlet pipe (10).

FIG. 1A shows the filter and separator device (1), where the high volume, lower pressure liquid inlet (2) is mounted tangentially to circular inlet chamber (3) which is, in turn, connected to the separation and filter chamber (4). The inlet chamber is designed to meet the least possible fluid flow resistance and directs pumped liquid (13) in a helical circular motion around the longitudinal upper outlet pipe (19) which passes through the center of the inlet chamber (3). The liquid (13) forms a circular spinning flow into and through the separation and filter chamber (14) without forming a vortex as in traditional hydro-cyclones. The liquid (13) accelerates in the inlet chamber (3) [which may be coned as in FIG. 1A or parallel (cylindrical) as in FIG. 1D] and increases the centrifugal forces acting on the flowing fluid and entrained particles. Particles with higher specific gravity than that of the fluid are drawn to the coned wall (3a) and flow down to the inlet (4) of the separation and filter chamber. These particles follow the inner wall down through the opening (18) to the sludge chamber (5). At the same time, the smaller lighter particles will follow the liquid along the outer surface (11a) of the cylindrical filter element (11) that runs longitudinally through the center of the separation and filter chamber (14).

The filter/separator unit (1) has both upper (19) and lower (10) outlets to make it practical for the installation and to give more flexibility for the piping and installation work. When one of the outlets is being used the other can be used for back flushing as needed. Compare FIGS. 2A and 2D. Both outlet pipes (19, 10) are installed with isolation valves (20, 21) that can be opened or closed manually or automatically. There are control valves installed on the two outlets that will control and maintain the pressure inside the unit to ensure automatic and continuous flow from the discharge chamber (5). The pressure inside the chamber has to be higher then the backpressure from the discharge.

The separation and filter chamber together with the sludge chamber (5) are built from one pipe with a flange in both ends and are built with a flow restrictor (6) that is coned downward into the sludge chamber (5) to reduce turbulence and back flows. The separation chamber's (4) length is dependent on the desired efficiency and flow capacity. Increased length will increase the time the liquid stays in the chamber and smaller particles get enough time to reach the perimeter of the separation chamber from the centrifugal forces.

The sludge chamber (5) receives sludge-like liquid through the opening (18) between the flow restrictor (6) and the wall of the pipe. The flow patterns are reduced when reaching the sludge chamber (5). Sludge is bled out through the sludge valve (9). The sludge valve (9) regulates the flow, and the internal pressure should be regulated to 3–10% of the main flow (13) depending on the amount of sludge in the discharge.

The outlet pipe (10) is connected to an end flange (8). The inner part of the outlet pipe (22) has the connection for the filter element (11).

The control valves (20, 21) on the outlet pipes (19, 10) maintain a constant pressure in the separation chamber (4) and maintaining enough internal pressure into the sludge chamber (5) to maintain a constant flow through the sludge valve (9).

Figure 1B:
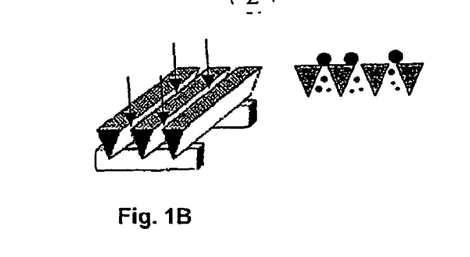
FIG. 1B includes a perspective view and a section view of a wedge wire screen filter surface for filtering larger particles from a high volume, low pressure liquid flow.
Figure 1C:
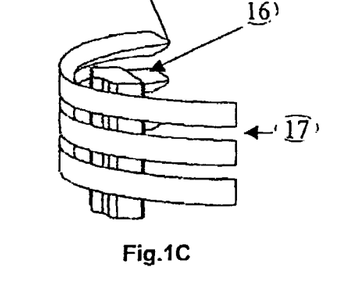
FIG. 1C is a fragmentary perspective view of the construction of the filter element.
Figure 1D:
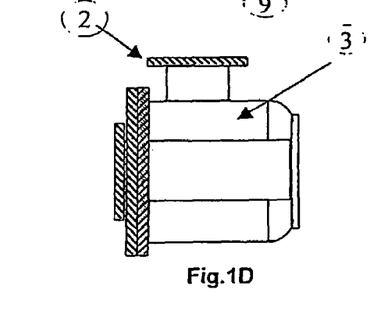
FIG. 1D is a schematic view of a modified inlet chamber having a cylindrical chamber.

FIG. 1B and FIG. 1C show enlarged parts of the filter element (11), which is built by rings of wedge wire connected to an inner frame (16) that runs axial with the filter element (11), where the opening between the wedge wires are decided per specification. As illustrated in FIG. 1B, larger particles are stopped and smaller particles fall through the wedge. The filtering capacity of the wedge wire screen is set by length and diameter. The filter element is built around an inner frame (16) to achieve mechanical strength, and to smooth the filter surface on the outside. The opening between the wedge wire (17) is V-shaped, and can be between 10 to 500 micron. Particles larger than the opening (17) will slide down along the surface (11a) of the filter towards the flow restrictor (6) while particles smaller than the opening will penetrate through the filter. Because of the wedge wire V-shape the individual opening (17) expands inward towards the center of the filter element and avoids getting particles trapped in the slots between the wedge wires. The ends of the filter element (11) can be fitted with different fasteners to the filter separator unit outlet pipes (10, 19).

In normal operation (FIG. 2A), liquid flows to the filter separator from a pump (32) through a first control valve (22) controlling the inlet of liquids to the unit which is open during normal operation. A second control valve (23) controlling the back flushing liquid is closed during normal operation. A third control valve (24) controlling the outlet of treated (clean) liquids is also a backpressure valve, which is partly closed to create the necessary backpressure for the sludge flow during normal operation. A control valve (25) regulates the sludge discharge. A differential pressure transmittal connected across the filter/separator unit between P1 and P2 transmits data to the PLC, and when the preset pressure differential limit of 30 mbar is reached, back flushing is initiated. Flow meter (26) and second flow meter (27) measure the flows in the main inlet line and the sludge line. The two flows are transmitted to a PLC, which converts the signal to a percentage of the main flow and are used for regulation of control valve 25. When a preset value (3–10%) is programmed into the PLC, the flow of the set value is maintained in the sludge line.

Figure 2A:
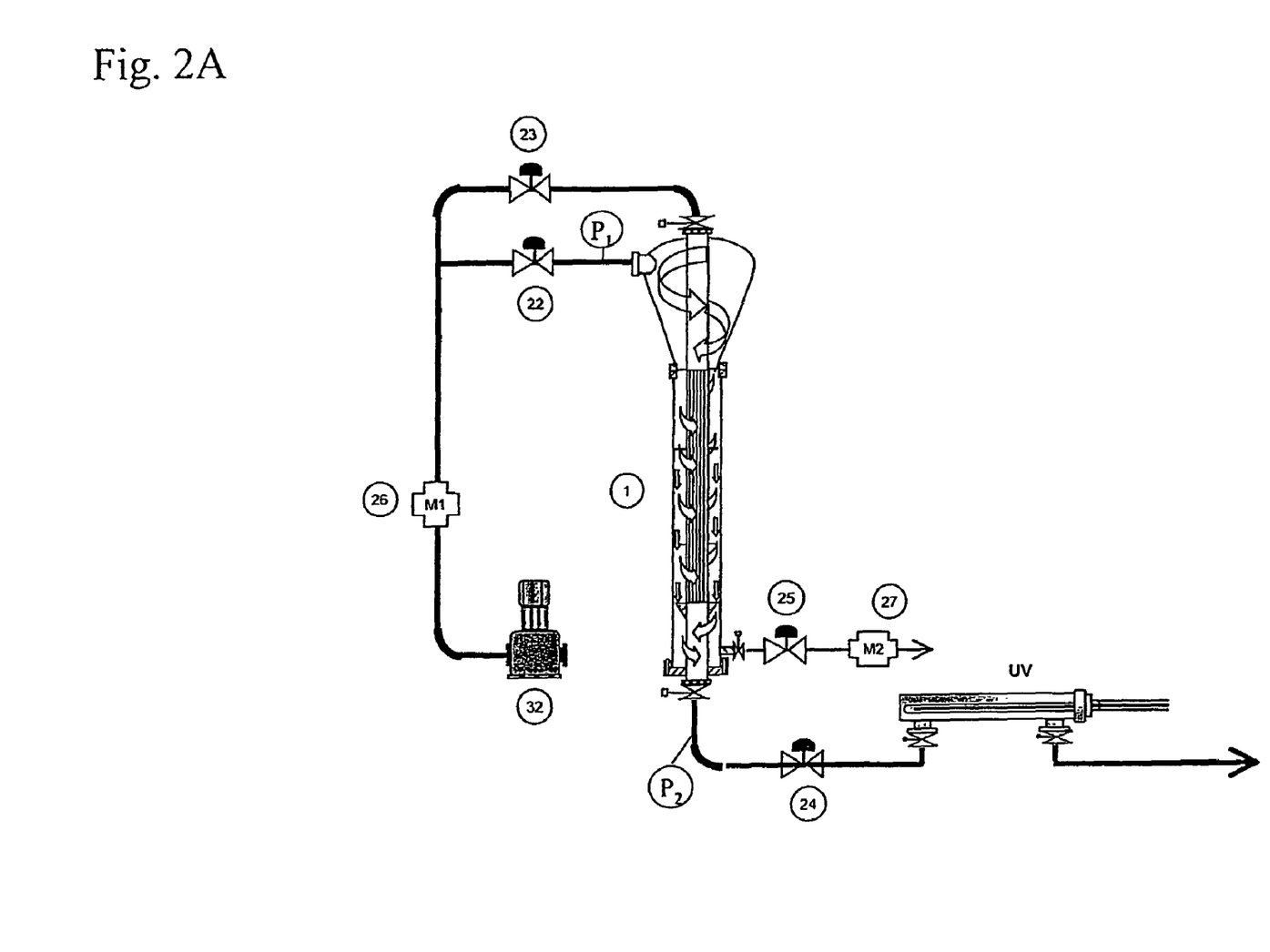
FIG. 2A is a schematic view of the filter/separator device using main liquid for back flushing, and including a UV chamber for inactivating aquatic nuisance species in processed liquid.

For back flushing and purging the filter screen, the control valves (22, 24) are closed during the back flushing. Second control valve (23) opens and sends untreated liquids through the center of the unit back flushing the particles out of the filter screen towards the discharge chamber. The back flushing cycle is set to a preset time limit, and when reaching the limit the system reverts to normal operation.

All valves are automated and operated by a PLC.

Figure 2B:
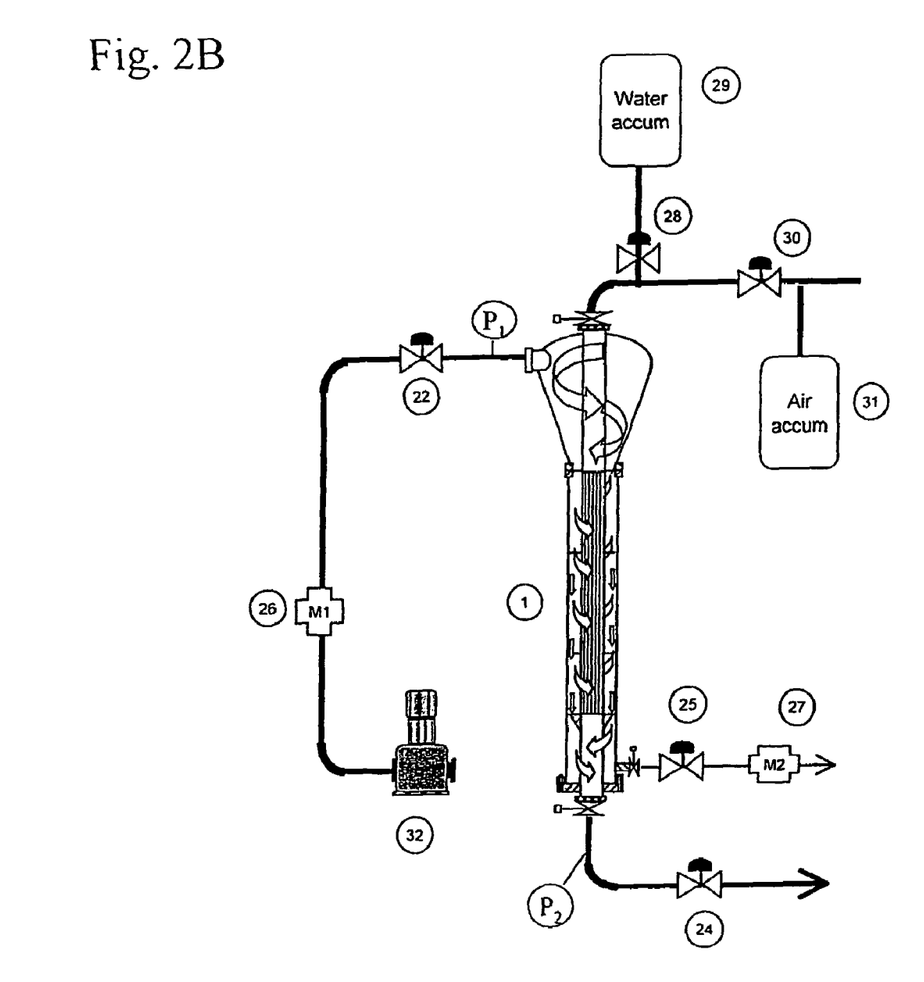
FIG. 2B is a schematic view of the filter/separator device using clean pressurized liquid for back flushing and compressed air for air scrubbing.

A modified embodiment of the invention is shown in FIG. 2B. In normal operation of this modified embodiment, liquid flows to the filter separator from a pump (32) and first control valve (22) controlling the inlet of liquids to the unit is open during normal operation. Fifth and sixth control valves (28, 30) controlling the back flushing liquid 29 and compressed air 31 are closed during normal operation. The third control valve (24) controlling the outlet of treated (clean) liquids is also a backpressure valve, which is partly closed to create the necessary backpressure for the sludge flow during normal operation. A control valve (25) regulates the sludge discharge. A differential pressure transmittal connected across the filter/separator unit between P1 and P2 sends data to the PLC, and when the preset level (30 mbar) is reached, back flushing is initiated.

For alternate back flushing, the first and third control valves (22, 24) close during back flushing. The fifth control valve (28) controlling a pressurized back flushing liquid tank (29) opens and clean liquids flow through the center of the unit back flushing the particles out of the filter screen towards the discharge chamber. The sixth control valve (30) controlling a pressurized air tank (31) opens towards the end of the back flushing cycle for air scrubbing the filter element (11). The back flushing cycle is set to a preset time limit, when reaching the limit, the system reverts to normal operation.

All valves are automated and operated by a PLC.

Figure 2C:
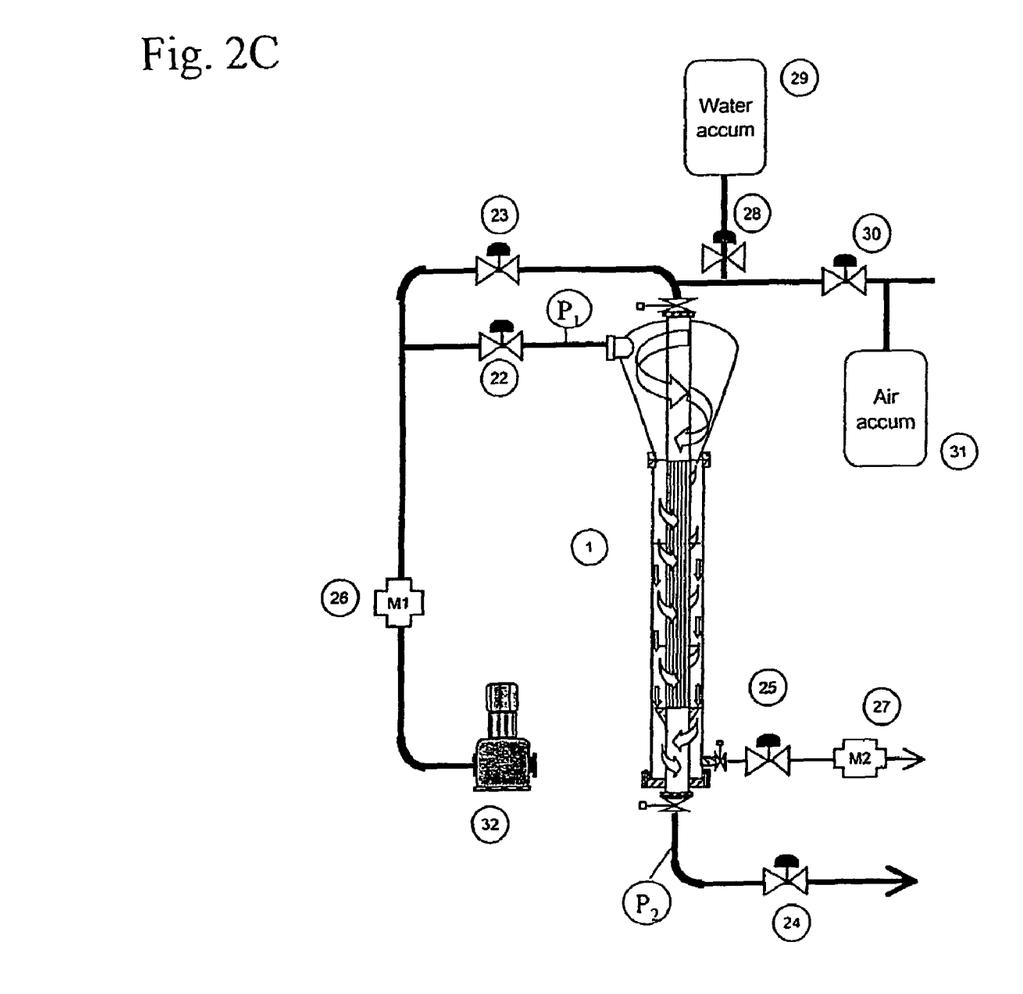
FIG. 2C is a schematic view of a combination of the operating components of FIGS. 2A and 2B.
Figure 2D:
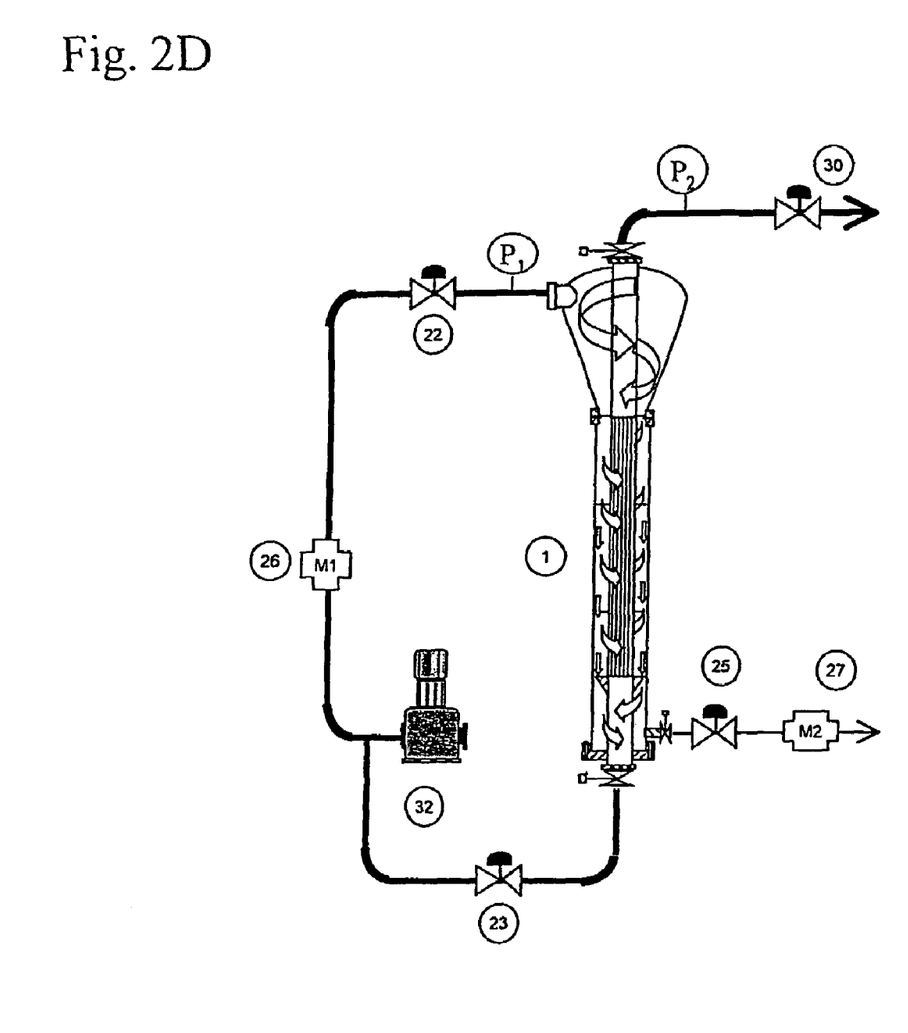
FIG. 2D is a schematic view of the filter/separator device using the upper pipe of the device as outlet pipe and the lower pipe as back flushing pipe.

As shown in FIG. 2C, the system can be configured to include both of the embodiments of FIGS. 2A and 2B set forth above. Raw water is used for back flushing if it is sufficiently clean. Alternatively, clean water is used.

The filter separator of this invention can be installed in every angle from a vertical to a horizontal position, but an angle of minimum 10 degrees towards the discharge is recommended. In a horizontal position and up to a position of 20 degrees, a continual bleeding of the sludge discharge is required. From a position of 20 degrees up to a vertical position the sludge discharge can be emptied according to need.

The hydro-cyclone part of the filter separator can be built in any material suited for the application. Standard materials are epoxy coated carbon steel, stainless steel, copper nickel, GRE (glass reinforced epoxy) and GRP (glass fiber reinforced polyester). Glass fiber reinforced polypropylene is recommended for use in seawater. This material is strong, light, and can easily be shaped to desired design. For the installation of larger flow systems aboard ships the hydro-cyclone can be built in several parts for easier access to the installation area. Other relevant materials are stainless steel or titanium.

The filter separator is developed to work with low pressure pumps and for high flows up to 1000 m$^3$/h depending on filter rate. The filter separator is installed with a back-pressure valve to enable it to maintain sludge discharge when installed under sea level. With the control valve installed on the outlet line a constant differential pressure is created to ensure a constant flow from the discharge chamber. No other separator has such a valve installed on the discharge and has higher demands for pressure loss.

The use of filter separator with UV in ballast water systems is shown in FIG. 2A. The filter separator removes particles and organisms to a specified micron size and the UV kills or inactivates the organisms, bacteria and pathogens in ballast water. Each microorganism must absorb a specific UV dose to be destroyed. The UV penetrates the bacteria wall and is absorbed by the DNA and consequently destroys life and prevents reproduction. The Microkill UV is designed for efficient inactivation of organisms with a very low-pressure drop to meet the requirements of ballast systems and pumps. UV light, when used in the wavelength ranging from 215–315 nm (nanometer) the UV-C spectrum causes irreparable damage to the DNA in bacteria and micro-organisms. The most potent and effective wavelength for damage of the DNA is 253.7 nm.

In accordance with the system process, ballast water is pumped by the ballast pump into the filter separator were larger particles and organisms are removed and discharged overboard were the ballast water originates. The processed ballast water flows into the UV system were the organisms; bacteria etc. are killed or inactivated when the DNA is damaged. From the UV system the ballast water is distributed into the different ballast tanks aboard the ship.

When ballast water is discharged in a receiving port, the water is pumped through the DV system a second time but bypasses the filter separator to avoid a handling problem of the sludge.

Various changes may be made to the equipment arrangements embodying the principles of the invention. The foregoing embodiments are set forth in an illustrative and not in a limiting sense. The scope of the invention is defined by the claims appended hereto.

We claim:

1. A filter separator apparatus for removing particles and organisms from liquid comprising:
    a conical inlet chamber, a separation and filter chamber, and a discharge chamber with a sludge outlet, the chambers connected along a common axis and together defining a liquid flow path;
    an inlet back flushing pipe, a screen filter and a lower outlet pipe aligned along said axis with the upper outlet positioned within the conical inlet chamber, the screen filter within the separation and filter chamber, and the lower outlet pipe within the discharge chamber;
    the conical inlet chamber having a tangentially mounted inlet pipe to establish a helical circular motion of entering liquid with the liquid accelerating in said helical motion without forming a vortex as the liquid moves along the conical chamber into and through, the separation and filter chamber;
    whereby particles and organisms of specific gravity greater than that of the liquid are carried by the liquid through the separation and filter chamber into the discharge chamber to the sludge outlet, and particles and organisms of specific gravity near to that of the liquid are filtered from liquid passing through the filter screen so that liquid purified of particles and organisms is discharged from one of the upper and lower outlet pipes depending on the installation concept.

2. A filter and separator apparatus as defined in claim 1 in which the upper and lower outlet pipes are each fitted with an outlet control valve for controlling flow of liquid from the apparatus; providing for back flush of liquid to purge the filter screen; and to maintain a discharge pressure head on the sludge outlet.

3. A filter and separator apparatus as defined in claim 1 in which a flow restrictor is positioned between the filter and separator chamber and discharge chamber to reduce liquid turbulence and back flow.

4. An apparatus as defined in claim 1 which further includes ultra violet light for inactivating any organisms, bacteria and pathogens in purified liquid discharged from the outlet pipe.

5. A filter separator system for removing particles and organisms from liquid comprising:
    a pump and a normally open first control valve for controlling inlet of fluids to the system;
    an inlet chamber, a separation and filter chamber, and a discharge chamber with a sludge outlet, the chambers being connected and together defining a liquid flow path;
    a screen filter within the separation and filter chamber, and first and second pipes defining outlets from the system for liquid passing through the screen filter;

the inlet chamber having a tangentially mounted inlet pipe to establish a helical circular motion of entering liquid with the liquid accelerating in said helical motion without forming a vortex as the liquid moves along the chamber into the separation and filter chamber;

a normally closed second control valve when open for directing inlet fluids through one of said outlet pipes for back flush of the screen filter;

a third control valve in the other of said outlet pipes for maintaining a back pressure on the system;

a fourth control valve for regulating sludge discharge;

whereby particles and organisms are removed from liquid in the filter and separation chamber and liquid purified of particles and organisms is discharged from the outlet pipe, and unfiltered liquid and sludge are removed from the apparatus through the sludge outlet.

6. A filter and separator system as defined in claim 5 which further comprises a first flow meter positioned at the pump outlet and a second flow meter positioned at the sludge outlet for regulating flow through the system.

7. A filter separator system for removing particles and organisms from liquid comprising:

a pump and a normally open inlet control valve for controlling inlet of fluids to the system;

an inlet chamber, a separation and filter chamber, and a discharge chamber with a sludge outlet, the chambers being connected and together defining a liquid flow path;

a screen filter within the separation and filter chamber, and first and second pipes defining outlets from the system for liquid passing through the screen filter;

the inlet chamber having a tangentially mounted inlet pipe to establish a helical circular motion of entering liquid with the liquid accelerating in said helical motion without forming a vortex as the liquid moves along the chamber into the separation and filter chamber;

a water accumulation tank and control valve connected to one of said inlet back flushing pipes for water back flush of the filter separator;

an air accumulation tank and control valve connected to one of said outlet pipes for air scrubbing of the filter separator;

a back pressure control valve in the outlet pipe for maintaining a back pressure on the system;

a sludge control valve for regulating sludge discharge;

whereby particles and organisms are removed from liquid in the filter and separation chamber and liquid purified of particles and organisms is discharged from the outlet pipe, and unfiltered liquid and sludge are removed from the apparatus through the sludge outlet.

8. A filter and separator system as defined in claim 7 which further comprises a first flow meter positioned at the pump outlet and a second flow meter positioned at the sludge outlet for monitoring and regulating flow through the system.

9. A filter separator system for removing particles and organisms from liquid comprising:

a pump and a normally open inlet control valve for controlling inlet of fluids to the system;

an inlet chamber, a separation and filter chamber, and a discharge chamber with a sludge outlet, the chambers being connected and together defining a liquid flow path;

a screen filter within the separation and filter chamber, and first and second pipes defining inlet and outlet from the system for liquid passing through the screen filter;

the inlet chamber having a tangentially mounted inlet pipe to establish a helical circular motion of entering liquid with the liquid accelerating in said helical motion without forming a vortex as the liquid moves along the chamber into the separation and filter chamber;

a normally closed inlet control valve when open for directing inlet fluids through one of said outlet pipes for back flush of the screen filter;

a water accumulation tank and control valve connected to one of said outlet pipes for water back flush of the filter separator;

an air accumulation tank and control valve connected to one of said outlet pipes for air scrubbing of the filter separator;

a back pressure control valve in the other of said outlet pipes for maintaining a back pressure on the system;

a sludge control valve for regulating sludge discharge;

whereby particles and organisms are removed from liquid in the filter and separation chamber and liquid purified of particles and organisms is discharged from the outlet pipe, and unfiltered liquid and sludge are removed from the apparatus through the sludge outlet.

10. A filter and separator system as defined in claim 9 which further comprises a first flow meter positioned at the pump outlet and a second flow meter positioned at the sludge outlet for monitoring and regulating flow through the system.

11. A method of removing particles and organisms from liquid comprising the steps of:

establishing a low pressure inflow flow of liquid;

directing the flow of liquid in a helical circular motion without creating a vortex;

accelerating the helical circular motion of liquid to separate particles and organisms having a specific gravity greater than the liquid;

passing the flow of liquid through a filter to screen out particles and organisms having a specific gravity near to that of the liquid;

collecting in a chamber a sludge of the separated and filtered particles and organisms together with a portion of liquid;

regulating the internal pressure of the sludge chamber to achieve a sludge flow which is up to 10% of the main flow;

discharging the remaining flow of liquid free of separated and filtered particles and organisms; and subjecting discharged liquid to ultraviolet light in a wave length between 215–315 nm to inactivate any organisms, bacteria and pathogens in the liquid.

12. A filter separator apparatus for removing particles and organisms from liquid comprising:

an inlet chamber, a separation and filter chamber, and a discharge chamber with a sludge outlet, the chambers being connected and together defining a liquid flow path;

a screen filter within the separation and filter chamber, and at least one pipe defining an outlet from the apparatus for liquid passing through the screen filter;

the inlet chamber having a tangentially mounted inlet pipe to establish a helical circular motion of entering liquid with the liquid accelerating in said helical motion without forming a vortex as the liquid moves along the chamber into the separation and filter chamber; and an ultra violet light source for inactivating any organisms, bacteria and pathogens in purified liquid discharged from the outlet pipe;

whereby particles and organisms are removed from liquid in the filter and separation chamber and liquid purified of particles and organisms is discharged from the outlet pipe, and unfiltered liquid and sludge are removed from the apparatus through the sludge outlet.

13. A method of removing particles and organisms from liquid comprising the steps of:
    establishing a low pressure flow of liquid;
    directing the flow of liquid in a helical circular motion without creating a vortex;
    accelerating the helical circular motion of liquid to separate particles and organisms having a specific gravity greater than the liquid;
    passing the flow of liquid through a filter to screen out particles and organisms having a specific gravity near to that of the liquid;
    purging the filter by back flushing with air;
    discharging as sludge the separated and filtered particles and organisms together with a portion of liquid; and
    discharging the remaining flow of liquid free of separated and filtered particles and organisms.

14. A method of removing particles and organisms from liquid comprising the steps of:
    establishing a low pressure flow of liquid;
    directing the flow of liquid in a helical circular motion without creating a vortex;
    accelerating the helical circular motion of liquid to separate particles and organisms having a specific gravity greater than the liquid;
    passing the flow of liquid through a filter to screen out particles and organisms having a specific gravity near to that of the liquid;
    maintaining a back pressure on the liquid flow;
    discharging as sludge the separated and filtered particles and organisms together with a portion of liquid; and
    discharging the remaining flow of liquid free of separated and filtered particles and organisms.

15. A method of removing particles and organisms from liquid comprising the steps of:
    establishing a low pressure flow of liquid;
    directing the flow of liquid in a helical circular motion without creating a vortex;
    accelerating the helical circular motion of liquid to separate particles and organisms having a specific gravity greater than the liquid;
    passing the flow of liquid through a filter to screen out particles and organisms having a specific gravity near to that of the liquid;
    discharging as sludge the separated and filtered particles and organisms together with a portion of liquid;
    discharging the remaining flow of liquid free of separated and filtered particles and organisms;
    metering the established flow of liquid; metering the discharge of sludge; and
    using a ratio of the metered values to control volume of liquid flow.

16. A method of removing particles and organisms from liquid comprising the steps of:
    establishing a low pressure flow of liquid;
    directing the flow of liquid in a helical circular motion without creating a vortex;
    accelerating the helical circular motion of liquid to separate particles and organisms having a specific gravity greater than the liquid;
    passing the flow of liquid through a filter to screen out particles and organisms having a specific gravity near to that of the liquid;
    subjecting discharged liquid to ultraviolet light to inactivate any organisms, bacteria and pathogens in the liquid;
    discharging as sludge the separated and filtered particles and organisms together with a portion of liquid; and
    discharging the remaining flow of liquid free of separated and filtered particles and organisms.

* * * * *